US009844748B2

(12) United States Patent
Lourenco et al.

(10) Patent No.: US 9,844,748 B2
(45) Date of Patent: Dec. 19, 2017

(54) METHOD TO CONDENSE AND RECOVER CARBON DIOXIDE (CO2) FROM CO2 CONTAINING GAS STREAMS

(75) Inventors: Jose Lourenco, Edmonton (CA); MacKenzie Millar, Edmonton (CA)

(73) Assignees: 1304338 Alberta Ltd, Edmonton (CA); 1304342 Alberta Ltd, Edmonton (CA)

( * ) Notice: Subject to any disclaimer, the term of this patent is extended or adjusted under 35 U.S.C. 154(b) by 872 days.

(21) Appl. No.: 12/120,194

(22) Filed: May 13, 2008

(65) Prior Publication Data

US 2008/0276800 A1  Nov. 13, 2008

(51) Int. Cl.
*F25J 3/00* (2006.01)
*B01D 53/00* (2006.01)
(Continued)

(52) U.S. Cl.
CPC .............. *B01D 53/002* (2013.01); *C10L 3/10* (2013.01); *F25J 3/067* (2013.01); *B01D 2257/504* (2013.01); *B01D 2258/018* (2013.01); *F17C 2221/013* (2013.01); *F25J 2210/62* (2013.01); *F25J 2210/70* (2013.01); *F25J 2215/04* (2013.01); *F25J 2220/80* (2013.01);
(Continued)

(58) Field of Classification Search
CPC ...... B01D 53/002; F25J 3/067; F25J 2210/62; F25J 2210/70; F25J 2220/80; F25J 2220/82; F25J 2220/84; F25J 2230/30; F25J 2230/60; F25J 2270/904; F25J 2270/906; F25J 2260/02; F25J 2260/20; F25J 2260/60; F25J 2260/80; F25J 2270/06; F25J 1/0027; F25J 1/0037; F25J 1/0035; F25J 1/0045; Y02E 20/14; Y02E 20/16; Y02E 20/18; Y02E 20/185
USPC .............................. 62/618, 611, 619; 429/17
See application file for complete search history.

(56) References Cited

U.S. PATENT DOCUMENTS 4,907,405 A * 3/1990 Polizzotto ........................ 60/772
5,467,722 A * 11/1995 Meratla ........................ 110/345
(Continued)

*Primary Examiner* — Keith Raymond
(74) *Attorney, Agent, or Firm* — Christensen O'Connor Johnson Kindness PLLC

(57) ABSTRACT

A method to condense and recover $CO_2$ from $CO_2$ containing streams. A first step involve providing at more than one heat exchanger, with each heat exchanger having a first flow path for passage of a first fluid and a second flow path for passage of a second fluid. A second step involves passing a stream of very cold natural gas sequentially along the second flow path of each heat exchanger until it is heated for distribution and concurrently passing a $CO_2$ containing stream sequentially along the first flow path of each heat exchanger, allowing the water vapor portion of the $CO_2$ containing stream to condense and precipitate on the condensing heat exchangers. A third step involves passing a water vapor free $CO_2$ containing stream to a cryogenic heat exchanger to condense, precipitate and recover $CO_2$. This processes results in the recovery of $CO_2$ and water vapor from $CO_2$ containing streams using condensing heat exchangers, chiller, compressor, expander and power generator to recover the low value thermal heat available in $CO_2$ containing waste streams.

3 Claims, 6 Drawing Sheets

(51) Int. Cl.
 *C10L 3/10* (2006.01)
 *F25J 3/06* (2006.01)
(52) U.S. Cl.
 CPC ........ *F25J 2220/82* (2013.01); *F25J 2220/84* (2013.01); *F25J 2230/30* (2013.01); *F25J 2270/904* (2013.01); *F25J 2270/906* (2013.01); *Y02C 10/12* (2013.01)

(56) References Cited

U.S. PATENT DOCUMENTS

| | | | |
|---|---|---|---|
| 6,282,917 B1* | 9/2001 | Mongan | 62/476 |
| 6,432,565 B1* | 8/2002 | Haines | 429/416 |
| 6,898,936 B1* | 5/2005 | Ochs et al. | 60/649 |
| 2005/0072164 A1* | 4/2005 | MacKay | 60/805 |
| 2007/0101732 A1* | 5/2007 | Mak | 62/50.3 |
| 2009/0001727 A1* | 1/2009 | De Koeijer et al. | 290/52 |
| 2009/0208388 A1* | 8/2009 | McKeigue et al. | 422/187 |
| 2009/0226308 A1* | 9/2009 | Vandor | 415/178 |

\* cited by examiner

METHOD TO CONDENSE AND RECOVER CARBON DIOXIDE (CO2) FROM CO2 CONTAINING GAS STREAMS

FIELD OF THE INVENTION

The present invention relates to a method of recovering $CO_2$ from $CO_2$ containing gas streams emitted from combustion, biological and chemical processes.

BACKGROUND OF THE INVENTION

Currently, the world's primary energy requirement is supplied by fossil fuels, causing rising emissions of greenhouse gases and related concerns over global warming and climate change. $CO_2$ is the most important of the greenhouse gases, being responsible for the majority of the enhanced greenhouse effect. The immediate challenge is to reduce $CO_2$ emissions into the atmosphere. In many applications the primary source of fuel is natural gas, its a clean burning fuel readily available and delivered by pipeline to point of use. The products of combustion (the flue gas) emitted to the atmosphere are typically at temperatures greater than 150 C, this is to prevent condensation and precipitation of acidic mists. The concentration of $CO_2$ in the flue gas is dependent on the mode of combustion. At present, these products of combustion are released in a gaseous form into the atmosphere.

SUMMARY OF THE INVENTION

The proposed process uses condensing heat exchangers to recover low value heat from the waste flue gases. The recovered heat is used to generate chill water to condense the water vapor in the flue gas. A once through pressurized LNG stream flows in a countercurrent stream to condense and precipitate the $CO_2$ from the flue gas stream. The proposed method condenses and recovers the $CO_2$ component in the flue gas, thus reducing a major greenhouse gas discharge into the atmosphere. As well, it first condenses and collects the water vapor formed in the combustion process.

Accordingly, there is provided a method to recover the emissions generated in these heat supplying devices, primarily carbon dioxide. A first step involve providing at least one heat exchanger section, with a first flow path for passage of the incoming $CO_2$ containing gas stream and a second flow path for passage of a high pressure compressed natural gas. A second step provides at least one heat exchanger section, with a first flow path for passage of a $CO_2$ containing gas and a second path for passage of a lean $CO_2$ gas stream. A third step involves providing at least one heat exchanger, with a first flow path for passage of a $CO_2$ containing gas stream and a second flow path for passage of atmospheric air stream. A fourth step provides at least one heat exchanger, with a first flow path for passage of a $CO_2$ containing gas stream and a second flow path for passage of a cold lean $CO_2$ gas stream. At this step, water vapor in the $CO_2$ containing gas stream begins to condense and precipitate. A fifth step provides at least one heat exchanger section, with a first flow path passage for a $CO_2$ containing gas stream and a second flow path for passage of a cold high pressure compressed natural gas. At this step the remaining water vapor in the $CO_2$ containing gas stream is precipitated and removed. A sixth step provides at least one heat exchanger section, with a first flow path for passage of a $CO_2$ containing gas stream and a second flow path for passage of pressurized liquid natural gas (LNG). At this step, the $CO_2$ is condensed, precipitated and recovered as a liquid. The cooled lean $CO_2$ flue gas stream is returned in a counter current flow to exchange its gained cold energy with the warm incoming $CO_2$ containing gas stream.

BRIEF DESCRIPTION OF THE DRAWINGS

These and other features will become more apparent from the following description in which reference is made to the appended drawings, the drawings are for the purpose of illustration only and are not intended to in any way limit the scope of the invention to the particular embodiment or embodiments shown, wherein.

DETAILED DESCRIPTION OF THE PREFERRED EMBODIMENT

Figure 1:
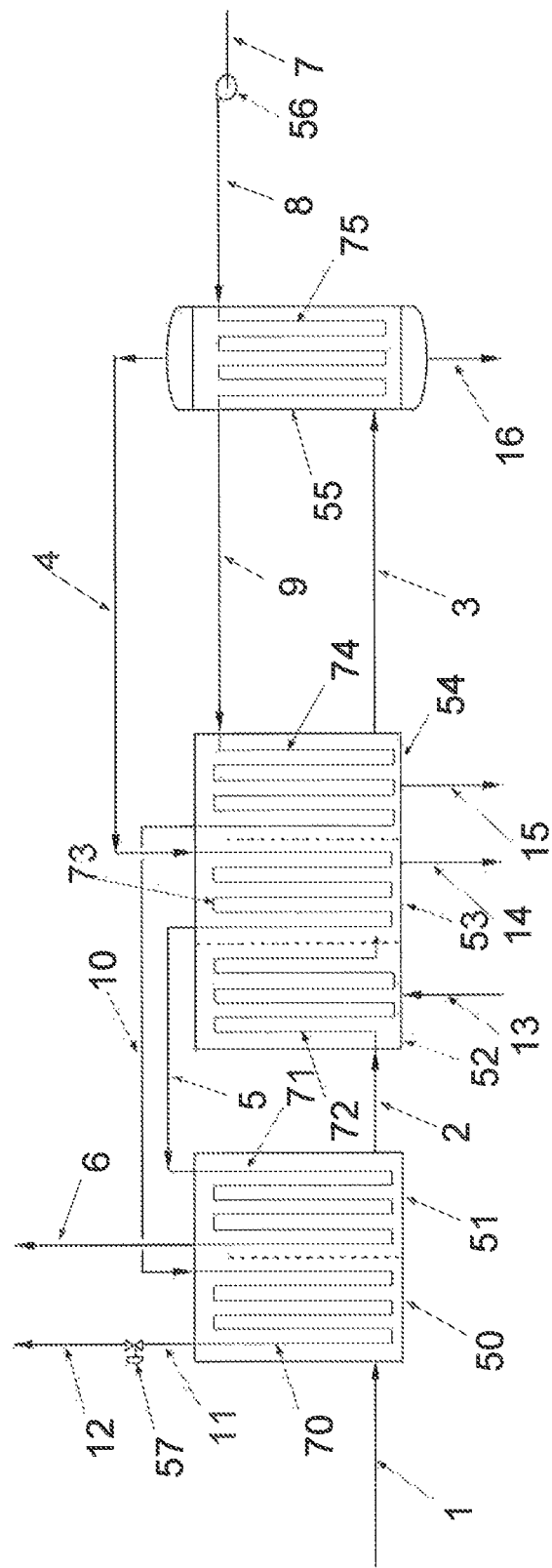
FIG. 1 is a schematic diagram of an apparatus used to condense and recover $CO_2$ from in $CO_2$ containing gas streams.
Figure 2:
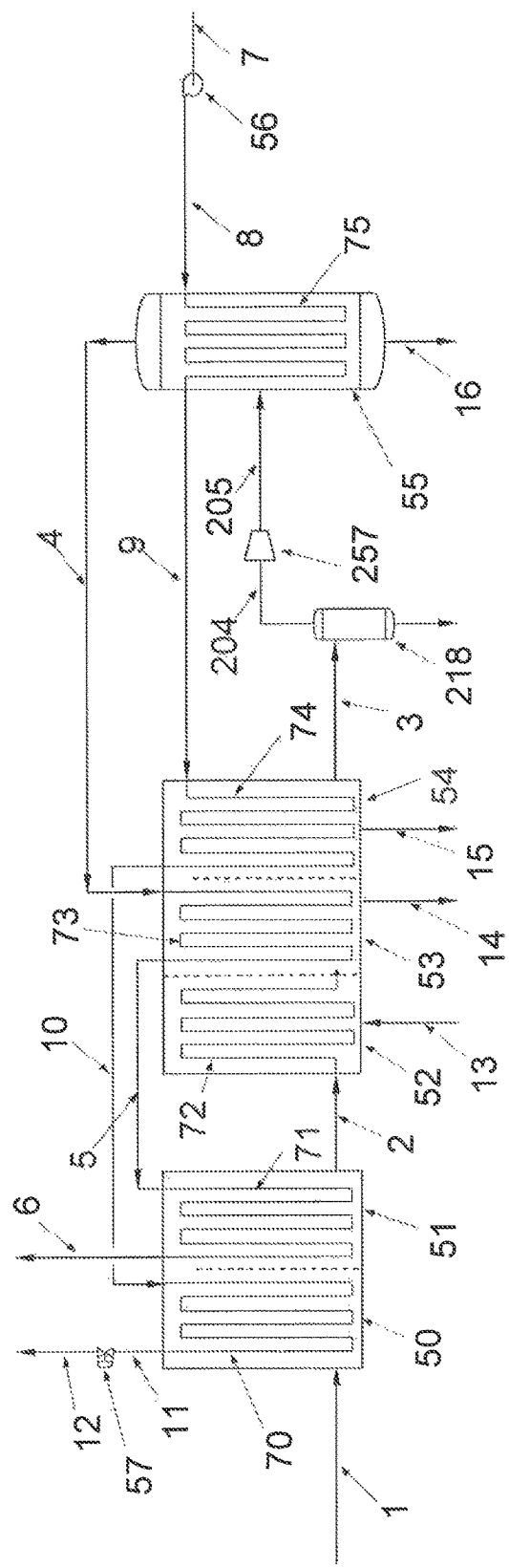
FIG. 2 is a schematic diagram of an alternative apparatus used to condense and recover $CO_2$.

The preferred method to recover and condense carbon dioxide embodiment will now be described with reference to FIGS. 1 through 6.

In this process cryogenic energy is supplied by a pressurized stream of LNG to condense and recover carbon dioxide. The $CO_2$ containing gas stream is cooled down in a counter current flow though various exchangers to remove the water vapor before condensing and recovering the $CO_2$.

The present practice releases the $CO_2$ containing flue gas streams into the atmosphere without recovering its low value heat, its water vapor and the $CO_2$. The proposed invention routes the $CO_2$ containing flue gases through duct 1 into heat exchanger section 50. A pressurized natural gas stream flows through line 10 into heating coil 70. The pressurized natural gas stream is heated by the warm flue gas and exits through line 11. The pressure control valve 57 is pre-set to meet the gas pressure requirement of line 12. The now cooler $CO_2$ containing flue gas stream enters heat exchanger section 51 where it exchanges heat with a lean $CO_2$ flue gas stream that enters through line 5 into heating coil 71. The lean $CO_2$ flue gas stream is heated by the warmer flue gas stream before exiting the exchanger through line 6 into the atmosphere. The $CO_2$ containing flue gas stream is now approaching its dew point and it enters heat exchanger section 52 through duct 2 and into coil 72. Atmospheric air enters section 52 though a once through duct 13 to further cool the $CO_2$ containing flue gas. The $CO_2$ containing flue gas has reached its dew point and now begins to condense its vapor in heat exchanger section 53. The condensed water exits the heat exchanger through line 14. A cold lean $CO_2$ flue gas stream enters the heat exchanger through line 4 into heating coil 73 and exits through line 5. This cold stream further reduces the temperature of the $CO_2$ containing flue gas to remove more water. The $CO_2$ containing flue gas is now near zero and now enters heat exchanger section 54 to remove the remaining water. The condensed water exits through line 15. A pressurized natural gas stream provides additional cooling entering the heat exchanger section 54 through line 9 into heating coil 74 and exits through line 10. The $CO_2$ containing flue gas stream is now free of water and enters heat exchanger section 55 through duct 3. A liquid natural gas stream 7 is pressurized by pump 56 to a pre-set pressure and then enters heat exchanger 55 through line 8 into heating coil 75. The $CO_2$ in stream 3 is condensed, liquefied and exits though line 16. The LNG having given up its cool energy is vaporized in coil 75 and exits through line 9.

Figure 3:
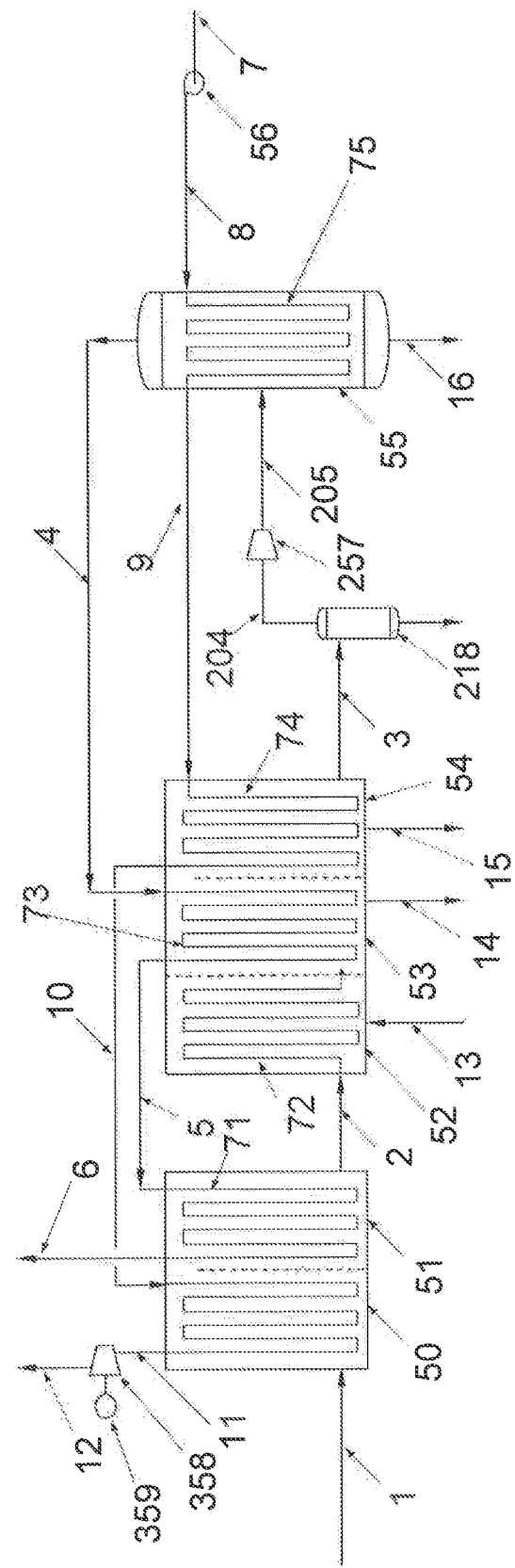
FIG. 3 is a schematic diagram of a further alternative apparatus used to condense and recover $CO_2$.
Figure 4:
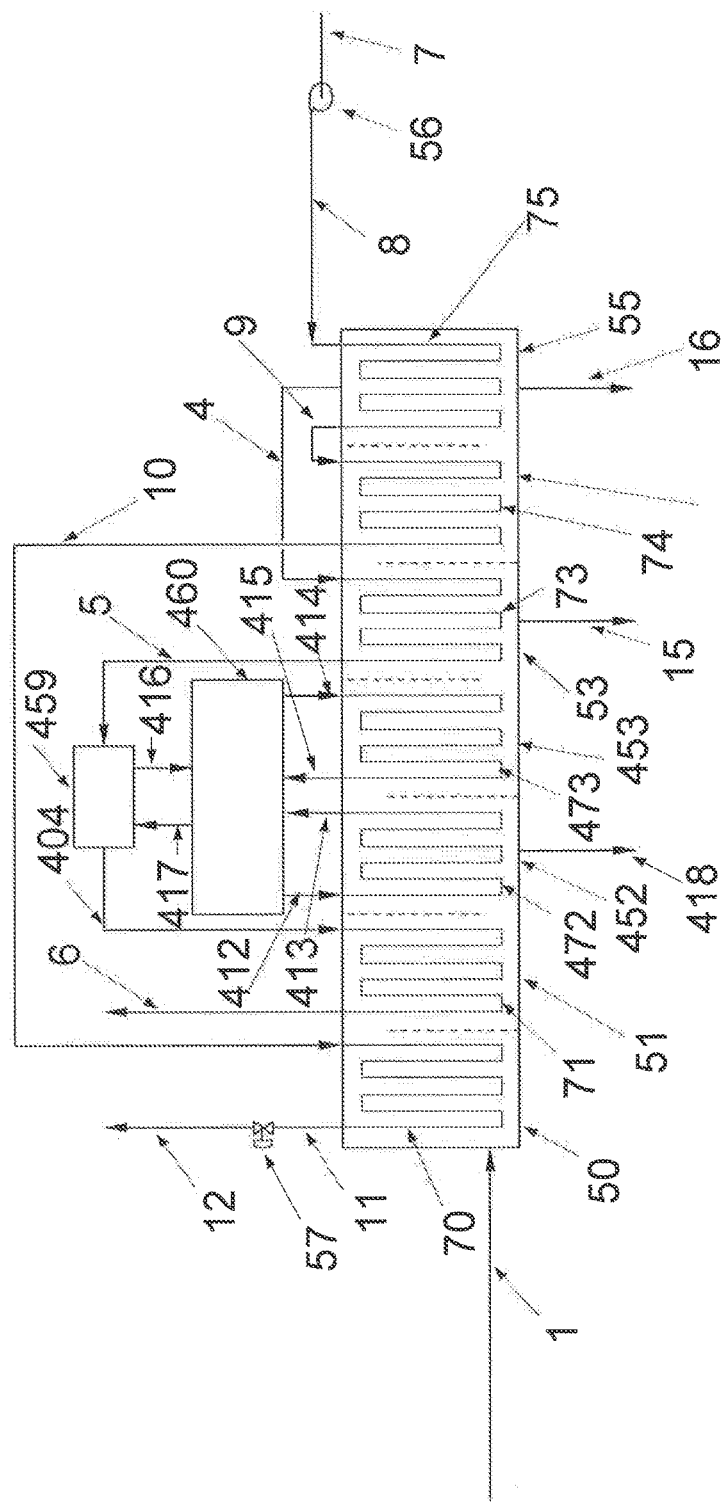
FIG. 4 is a schematic diagram of a further alternative apparatus used to condense and recover $CO_2$.
Figure 5:
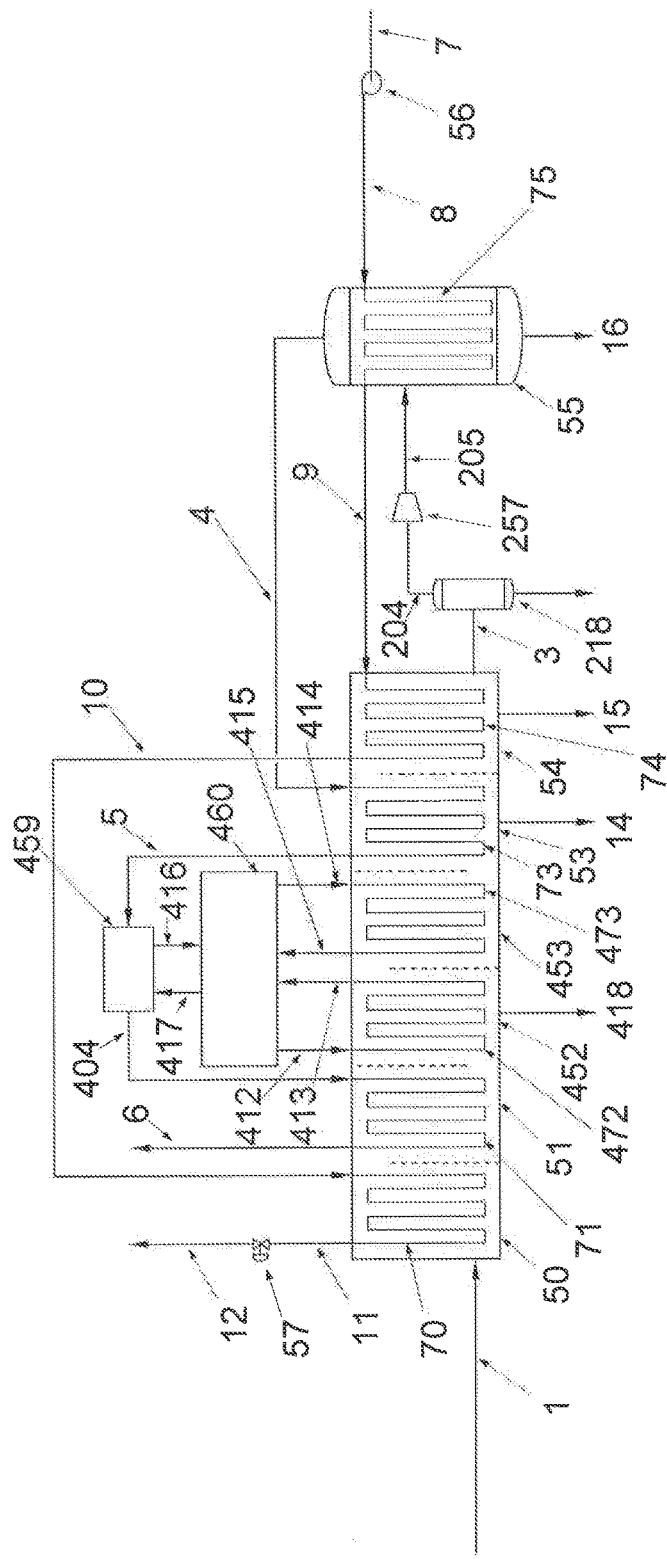
FIG. 5 is a schematic diagram of a further alternative apparatus used to condense and recover $CO_2$.

The process cools and recovers the $CO_2$ in the flue gas stream using condensing heat exchangers and the cryogenic temperatures of LNG. There are various process variations that can enhance the recovery of the low value waste heat present in the $CO_2$ containing flue gas. Moreover, the process efficiency will increase proportionally to the $CO_2$ concentration of the flue gas. A variation of FIG. 2 follows the process as in FIG. 1 with the addition of a separator 218 after heat exchanger 54 to remove any moisture in the stream prior to compressing the $CO_2$ containing flue through compressor 257. Line 204 conducts the gas stream from the separator 218 to the compressor 257. Compressing the $CO_2$ containing flue gas before cooling it with LNG reduces the cryogenic load in heat exchanger 55. Line 205 conducts the output from the compressor 257 to the heat exchanger 55. In FIG. 3, the added improvement to the process over FIG. 2 has the addition of a gas expander 358 and power generator 359. These components take advantage of the thermal energy gained in section 50 by the compressed natural gas from the $CO_2$ containing flue gas to generate electricity. In FIG. 4 there is another improvement on the process over FIG. 3 where an absorption chiller 460 replaces the atmospheric air heat exchanger to further recover the low waste heat available to generate chilled water for use in cooling the $CO_2$ containing flue gas. A different variation of FIG. 4 over FIG. 3 has a pressure control valve 57, known as a JT-valve, in lieu of a gas expander. Another variation of FIG. 4 over FIG. 3 is the removal of the $CO_2$ containing flue gas compressor. In FIG. 5 the variation of FIG. 4 is the addition of $CO_2$ containing flue gas compressor 257. The complete and maximized recovery process arrangement is shown in FIG. 6 where chiller 460, compressor 257, expander 358, and power generator 359 maximize the recovery of low value waste heat, water vapor recovery and $CO_2$ recovery.

Figure 6:
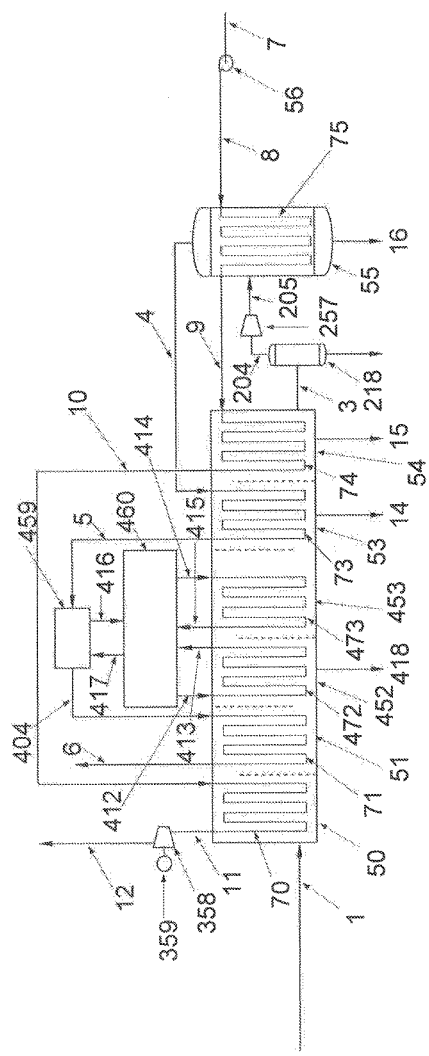
FIG. 6 is a schematic diagram of a further alternative apparatus used to condense and recover $CO_2$.

Referring to FIGS. 4-6, the gas stream in line 412 enters section 452 through coil 472 to extract heat from the flue gas stream and then enters chiller 460 through line 413. The chilled stream in line 414 enters section 453 through coil 473 to further cool the flue gas stream and return to the chiller through line 415. A condenser 459 provides cooling for chiller 460 by exchanging the cool in stream 5 with the heat in stream 417. The condensed stream 416 returns to the chiller 460 and the heated flue gas stream 404 enters section 51. Similar to line 15, condensed water exits through line 418.

In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be one and only one of the elements.

It will be apparent to one skilled in the art that modifications may be made to the illustrated embodiment without departing from the spirit and scope of the invention as hereinafter defined in the Claims.

What is claimed is:

1. A method to cool and condense a CO2 containing gas stream to recover CO2, comprising the steps of:
    providing more than one heat exchanger, the more than one heat exchanger comprising at least one water condensing heat exchanger and at least one CO2 condensing heat exchanger, each heat exchanger having a first flow path for passage of a first fluid and a second flow path for passage of a second fluid;
    passing an uncompressed CO2 containing gas stream along the first flow path of the water condensing heat exchanger to cool and condense water vapor in the CO2 containing gas stream, and through a separator to separate condensed water from the CO2 containing gas stream;
    cooling coolant water in a chiller that is powered by heat in the CO2 containing gas stream;
    compressing the CO2 containing gas stream exiting the separator and then cryogenically cooling the CO2 containing gas stream in the at least one CO2 condensing heat exchanger, the at least one CO2 condensing heat exchanger condensing at least a portion of the CO2 in the CO2 containing gas stream, and
    separating the condensed CO2 from the cooled CO2 containing gas stream in a CO2 separator;
    passing the cooled CO2 containing gas stream from the CO2 separator along the second flow path of at least one heat exchanger to cool the CO2 containing gas stream in the first flow path;
    passing the cooled coolant water from the chiller along the second flow path of at least one heat exchanger to cool the CO2 containing gas stream in the first flow path;
    generating a natural gas stream at a temperature and pressure suitable for distribution in a distribution natural gas line from a Liquid Natural Gas (LNG) stream by:
        firstly, pressurizing the LNG stream in a liquid pump;
        secondly, heating the pressurized LNG stream in stages by passing the pressurized LNG stream through the second flow path of the at least one CO2 condensing heat exchanger and at least one additional heat exchanger to generate the natural gas stream; and
        thirdly, passing the natural gas stream through a gas expander to depressurize and cool the natural gas stream to a pressure and temperature suitable for distribution, the natural gas stream being expanded by the gas expander without being consumed, the gas expander being capable of generating power from expanding natural gas before discharging the natural gas stream into the distribution natural gas line for downstream consumption.

2. The method of claim 1, wherein the CO2 containing gas stream is a stream of diverted flue gas.

3. The method of claim 1, further comprising the step of passing the cooled water from the chiller through the second flow path of at least one heat exchanger to cool the CO2 containing gas stream.

* * * * *